United States Patent
Smith et al.

(10) Patent No.: US 10,298,498 B2
(45) Date of Patent: *May 21, 2019

(54) ROUTING OF TRAFFIC IN NETWORK THROUGH AUTOMATICALLY GENERATED AND PHYSICALLY DISTINCT COMMUNICATION PATHS

(71) Applicant: Schweitzer Engineering Laboratories, Inc., Pullman, WA (US)

(72) Inventors: Rhett Smith, Kuna, ID (US); Marc Ryan Berner, Monroe, WA (US); Josh Powers, Pullman, WA (US); David M. Buehler, Moscow, ID (US); Jason A. Dearien, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,586

(22) Filed: Nov. 15, 2017

(65) Prior Publication Data

US 2018/0083879 A1 Mar. 22, 2018

Related U.S. Application Data

(63) Continuation of application No. 14/803,706, filed on Jul. 20, 2015, now Pat. No. 9,866,483.

(51) Int. Cl.
*H04L 12/801* (2013.01)
*H04L 12/721* (2013.01)
*H04L 12/703* (2013.01)
*H04L 12/707* (2013.01)

(52) U.S. Cl.
CPC .............. *H04L 47/12* (2013.01); *H04L 45/12* (2013.01); *H04L 45/28* (2013.01); *H04L 45/22* (2013.01)

(58) Field of Classification Search
None
See application file for complete search history.

(56) References Cited

U.S. PATENT DOCUMENTS

| 9,286,171 | B2 * | 3/2016 | Cardona | G06F 11/2033 |
| 2014/0376406 | A1 * | 12/2014 | Kim | H04L 41/12 370/254 |
| 2015/0312658 | A1 * | 10/2015 | Winzer | H04Q 11/0005 398/5 |

* cited by examiner

*Primary Examiner* — Alex Skripnikov
(74) *Attorney, Agent, or Firm* — Jared L. Cherry; Richard M. Edge

(57) ABSTRACT

The present disclosure pertains to systems and methods to identify high-priority traffic within a software defined network ("SDN") and to route such traffic through physically distinct communication paths. Such routing may help to reduce network congestion faced by high-priority traffic and increase the reliability of transmission of such data. Certain embodiments may further be configured to generate a failover communication path that is physically distinct from a primary communication path. Still further, certain embodiments may be configured to suggest enhancements to a network that may improve a reliability criterion.

20 Claims, 6 Drawing Sheets

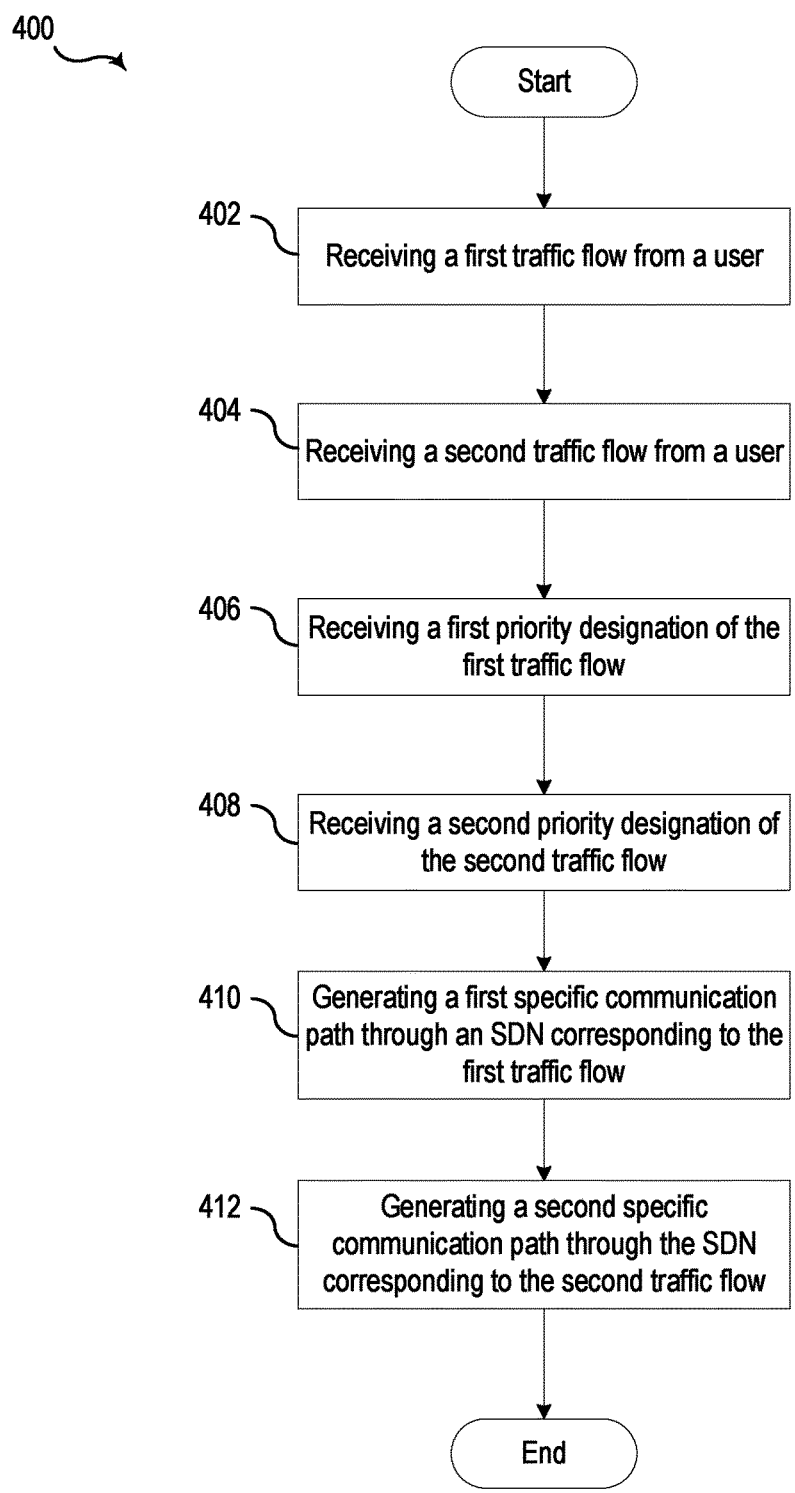

ROUTING OF TRAFFIC IN NETWORK THROUGH AUTOMATICALLY GENERATED AND PHYSICALLY DISTINCT COMMUNICATION PATHS

RELATED APPLICATION

This application claims benefit under 35 U.S.C. § 120 as a continuation of U.S. patent application Ser. No. 14/803,706 filed on 20 Jul. 2015 naming Rhett Smith, Marc Ryan Berner, Josh Powers, David M. Buehler, and Jason Dearien as inventors, and titled "Routing of Traffic in Network Through Automatically Generated and Physically Distinct Communication Paths", which is hereby incorporated by reference in its entirety.

FEDERALLY SPONSORED RESEARCH OR DEVELOPMENT

This invention was made with U.S. Government support under Contract No.: DOE-OE0000678. The U.S. Government may have certain rights in this invention.

TECHNICAL FIELD

The present disclosure pertains to systems and methods for automatically routing traffic within a software defined network ("SDN"). More specifically, but not exclusively, the present disclosure pertains to reducing the user burden of configuring an SDN and increasing the reliability of the SDN by routing traffic through physically distinct communication paths.

BRIEF DESCRIPTION OF THE DRAWINGS

Non-limiting and non-exhaustive embodiments of the disclosure are described, including various embodiments of the disclosure, with reference to the figures, in which:

FIG. 4 illustrates a flow chart of a method for receiving a first traffic flow and a second traffic flow and automatically generating corresponding communication routes through an SDN using a configuration utility consistent with embodiments of the present disclosure.

DETAILED DESCRIPTION

Figure 1:
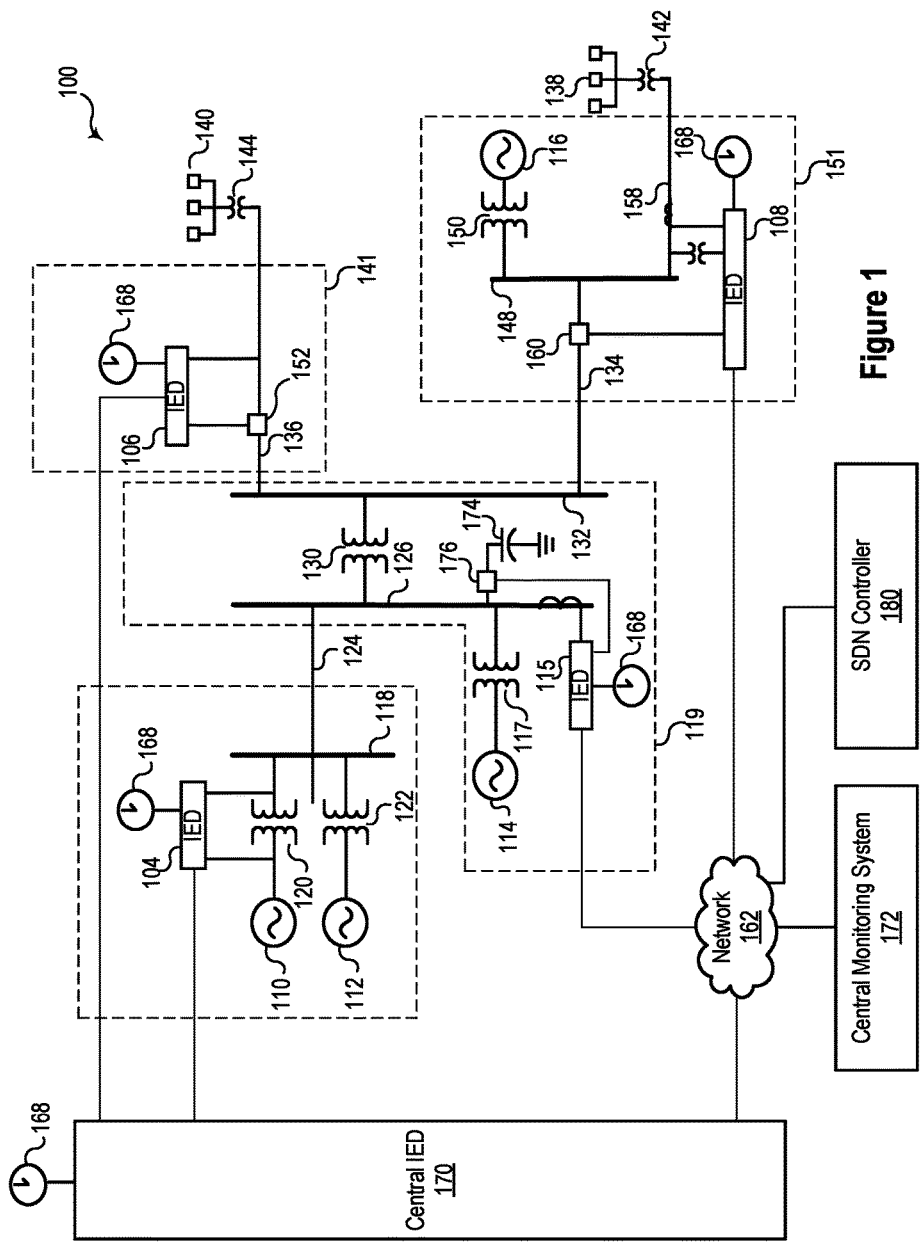
FIG. 1 illustrates a simplified one-line diagram of an electric power transmission and distribution system in which a plurality of communication devices may facilitate communication in a software defined network consistent with embodiments of the present disclosure.

Modern electric power distribution and transmission systems may incorporate a variety of communication technologies that may be used to monitor and protect the system. The communication equipment may be configured and utilized to facilitate an exchange of data among a variety of devices that monitor conditions on the power system and implement control actions to maintain the stability of the power system. The communication networks carry information utilized for the proper assessment of power system conditions and for implementing control actions based on such conditions. Such messages may be subject to time constraints because of the potential for rapid changes in conditions in an electric power transmission and distribution system. In other words, if the messages are delayed, the data in the messages may no longer be accurate or useful to a receiving device.

Some electric power transmission and distribution systems may incorporate software defined network ("SDN") technologies that utilize a controller to configure and monitor on the network. SDN technologies offer a variety of features that may be advantageous in electric power systems (e.g., deny-by-default security, better latency control, symmetric transport capabilities, redundancy and fail over planning, etc.).

An SDN allows a programmatic change control platform, which allows an entire communication network to be managed as a single asset, simplifies the understanding of the network, and enables continuous monitoring of a network. In an SDN, the systems that decide where the traffic is sent (i.e., the control plane) are separated from the systems that perform the forwarding of the traffic in the network (i.e., the data plane).

The control plane may be used to achieve the optimal usage of network resources by creating specific traffic flows through the communication network. A traffic flow, as the term is used herein, refers to a set of parameters used to match and take action based on network packet contents. Traffic flows may permit specific paths based on a variety of criteria that offer significant control and precision to operators of the network. In contrast, in large traditional networks, trying to match a network discovered path with an application desired data path may be a challenging task involving changing configurations in many devices. To compound this problem, the management interfaces and feature sets used on many devices are not standardized. Still further, network administrators often need to reconfigure the network to avoid loops, gain route convergence speed, and prioritize a certain class of applications.

Significant complexity in managing a traditional network in the context of an electric power transmission and distribution system arises from the fact that each network device (e.g., a switch or router) has control logic and data forwarding logic integrated together. For example, in a traditional network router, routing protocols such as Routing Information Protocol (RIP) or Open Shortest Path First (OSPF) constitute the control logic that determines how a packet should be forwarded. The paths determined by the routing protocol are encoded in routing tables, which are then used to forward packets. Similarly, in a Layer 2 device such as a network bridge (or network switch), configuration parameters and/or Spanning Tree Algorithm (STA) constitute the control logic that determines the path of the packets. Thus, the control plane in a traditional network is distributed in the switching fabric (network devices), and as a consequence, changing the forwarding behavior of a network involves changing configurations of many (potentially all) network devices.

In an SDN, a controller embodies the control plane and determines how packets (or frames) should flow (or be forwarded) in the network. The controller communicates this information to the network devices, which constitute the data plane, by setting the forwarding tables in the devices. This enables centralized configuration and management of a network. As such, the data plane in an SDN consists of relatively simple packet forwarding devices with a communications interface to the controller to receive forwarding information. In addition to simplifying management of a network, an SDN architecture may also enable monitoring and troubleshooting features that may be beneficial for use in an electric power distribution system, including but not limited to: mirroring a selected traffic flow rather than mirroring a whole port; alarming on bandwidth when it gets close to saturation; providing metrics (e.g., counters and meters for quality of service, packet counts, errors, drops, or overruns, etc.) for a specified flow; permitting monitoring of specified applications rather than monitoring based on VLANs or MAC addresses.

In various embodiments, an SDN may include failover traffic flows that are utilized in the event that corresponding primary traffic flows are disrupted. The inventors of the present disclosure have recognized that certain advantages may be achieved by identifying high priority traffic flows in an SDN and routing such traffic flows through physically distinct communication paths. High priority traffic flows in a data network used to monitor an electric power distribution system are commonly sensitive to latency. If the latency is too high, data carried by the traffic flow may no longer be useable by the receiving device. Moreover, changes in conditions associated with the electric power system (e.g., faults, blackouts, etc.) may lead to spikes in network traffic. Such spikes in traffic may increase the likelihood that delivery of high priority traffic will be delayed or data packets carrying high priority traffic will be dropped. Such results may impede the ability of the control system of the electric power system to respond effectively to the change in conditions.

To help reduce the possibility of network congestion interfering with delivery of high priority traffic, a priority setting for a traffic flow may be designated. Based on the priority setting, the systems and methods disclosed herein may create physically distinct high priority traffic flows. In other words, the high priority traffic flows may be routed through physically distinct communication paths (i.e., distinct physically communication links, switches, routers, etc.) to achieve a larger bandwidth guard on the physical communication links on which high priority traffic travels. Further, routing high priority traffic through physically distinct communication paths may improve latency (i.e., total time to transmit data from a source to a destination) and jitter (i.e., the variation in the total time to transmit data from a source to a destination between consecutive packets). Such improvements may be realized, at least in part because of reduction in buffer egress time at each of a plurality of intermediate devices along a communication flow in a network.

Still further, the inventors of the present disclosure have recognized that reliability may also be enhanced by automatically configuring failover traffic flows that are routed through physically distinct communication paths from the primary traffic flow. In connection with critical infrastructure, such as electrical power systems, reliability may be designed to an N−1 reliability criterion or greater. In a system satisfying the N−1 reliability criterion, the system may remain fully operational in spite of the loss of a single element. Physically separating the primary traffic flow from a corresponding failover traffic flow may help to ensure that a system satisfies the N−1 reliability criterion because the primary flow path and the failover traffic flow are not both susceptible to any single point of failure. Moreover, automatic generation of the failover traffic flows may substantially reduce the configuration burden on operators of the system. In some embodiments, a user may be prompted to confirm the automatically generated secondary path.

In various embodiments, a variety of criteria may be evaluated to generate the secondary path. Such criteria may include the shortest path between communicating hosts, shared bandwidth, quality of service tags, switch backplane loads, and physical topology. Still further, various embodiments may be configured to determine enhancements to the network that may increase the network's reliability. For example, the system may calculate enhancements to achieve N−1 reliability to N−3 reliability. This would in turn help the end user know if the additional costs are worth the reliability improvement.

The present disclosure may also enable more efficient use of resources in SDNs in certain embodiments. In a typical network that utilizes the rapid spanning tree protocol, redundant connections between switches are blocked to mitigate against loops. In contrast, there is no need for blocking ports in an SDN, and as such, there are many more possibilities to physically separate traffic flows without the need to configure VLANs.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc. that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

FIG. 1 illustrates a simplified one-line diagram of an electric power transmission and distribution system 100 in which a plurality of communication devices may facilitate communication in a software defined network consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The time signal may be distributed in system 100 using a communications network 162 or using a common time source, such as a Global Navigation Satellite System ("GNSS"), or the like.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized in order to perform a variety of tasks that pertain to network communications and/or to operation of equipment within system 100.

An SDN controller 180 may be configured to interface with equipment in network 162 to create an SDN that facilitates communication between IEDs 170, 115, 108, and monitoring system 172. In various embodiments, SDN controller 180 may be configured to interface with a control plane (not shown) in network 162. Using the control plane, controller 180 may be configured to direct the flow of data within network 162.

In various embodiments, controller 180 may include a traffic routing system configured to automatically generate specific communication paths created based on user-specified traffic flows within system 100. For example, a user-specified traffic flow may indicate that IED 115 provides data to IED 108. Based on the user-specified traffic flow between IED 115 and IED 108, the traffic routing system may identify and configure a plurality of intermedia devices (e.g., switches, physical communication links, etc.) to implement a specific communication path through network 162. Automating the creation of specific communication paths based on high-level traffic flows may reduce the configuration burden imposed on operators of system 100.

In various embodiments, traffic flows within system 100 may be associated with a priority designation. The priority designation may be used to identify high-priority traffic and to route such traffic through physically distinct communication paths. Among other benefits, such routing may help to reduce network congestion faced by high-priority traffic and increase the reliability of transmission of such data. Further, such routing may help to prioritize the allocation of resources when problems arise in system 100. For example, lower priority traffic may be dropped and higher priority traffic may be retained in a scenario in which the network is approaching its data transmission capacity. In another example, a communication channel carrying high-priority traffic may be prioritized for repair before another communication channel carrying lower-priority traffic.

Further, in various embodiments, a traffic routing system may be configured to automatically generate a failover traffic flow that is utilized in the event that a primary flow path is disrupted. The specific failover communication path generated by the traffic routing system may be physically distinct from the specific primary communication path, so that the primary flow path and the failover traffic flow are not both susceptible to a single point of failure. In other words, the primary flow path and the failover traffic flow may satisfy an N−1 reliability criterion. In connection with critical infrastructure, reliability may be designed to the N−1 reliability criterion or to a more stringent reliability criterion (e.g., N−3).

Figure 2:
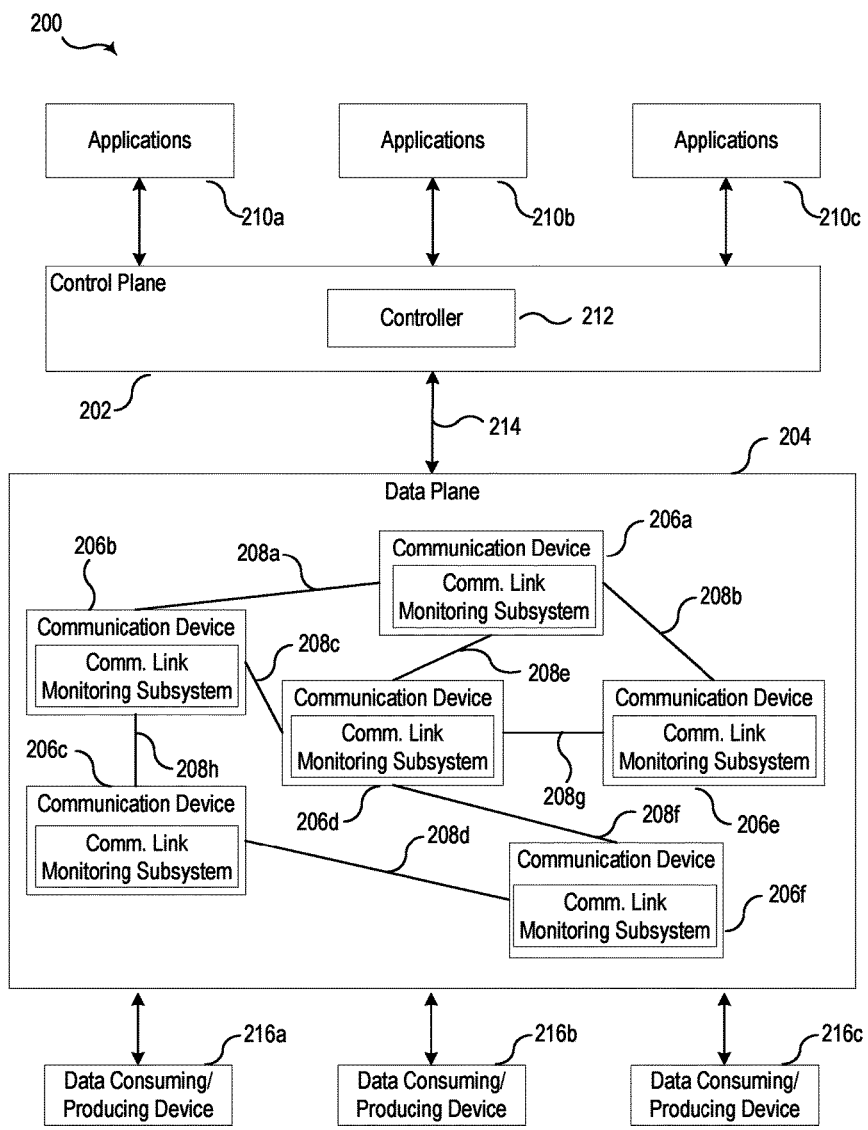
FIG. 2 illustrates a conceptual representation of an SDN architecture including a control plane, a data plane, and a plurality of data consumers/producer devices that may be deployed in an electric power transmission and distribution system consistent with embodiments of the present disclosure.

FIG. 2 illustrates a conceptual representation 200 of an SDN architecture including a control plane 202, a data plane 204, and a plurality of data consumers/producer devices 216a-216c that may be deployed in an electric power transmission and distribution system consistent with embodiments of the present disclosure. The control plane 202 directs the flow of data through the data plane 204. More specifically, a controller 212 may communicate with the plurality of communication devices 206a-206f via an interface 214 to establish traffic flows. The controller may specify rules for routing traffic through the data plane 204 based on a variety of criteria.

As illustrated, the data plane 204 includes a plurality of communication devices 206a-206f in communication with one another via a plurality of physical communication links 208a-208h. In various embodiments, the communication devices 206a-206f may be embodied as switches, routers, multiplexers, and other types of communication devices. The physical communication links 208a-208h may be embodied as Ethernet, fiber optic, and other forms of data communication channels. As illustrated, the physical communication links 208a-208h between the communication devices 206a-206f may provide redundant connections such that a failure of one of the physical communication links 208a-208h is incapable of completely blocking communication with an affected communication device. In some embodiments, the physical communication links 208a-208h may provide an N−1 redundancy or better.

The plurality of applications 210a-210c may represent a variety of applications 210a-210c operating in an applications plane. In the SDN architecture illustrated in FIG. 2, controller 212 may expose an application programming interface (API) that services 210a-210c can use to configure the data plane 204. In this scenario, controller 212 may act as an interface to the data plane 204 while the control logic resides in the applications 210a-210c. The configuration of controller 212 and applications 210a-210c may be tailored to meet a wide variety of specific needs.

The data consuming/producing devices 216a-216c may represent a variety of devices within an electric power transmission and distribution system that produce or consume data. For example, data consuming/producing devices may be embodied as a pair of transmission line relays configured to monitor an electrical transmission line. The transmission line relays may monitor various aspects of the electric power flowing through the transmission line (e.g., voltage measurements, current measurements, phase measurements, synchrophasers, etc.) and may communicate the measurements to implement a protection strategy for the transmission line. Traffic between the transmission line relays may be routed through the data plane 204 using a plurality of traffic flows implemented by controller 212. Of course, data consuming/producing devices 216a-216c may be embodied by a wide range of devices consistent with embodiments of the present disclosure.

The plurality of communication devices 206a-206f may each include a communication link monitoring system that may monitor a plurality of physical communication links 208a-208h. Various parameters may be monitored for different types of physical communication links. For example, if a communication link monitoring system is monitoring a fiber optic communication link, the monitoring system may collect information regarding reflection characteristics, attenuation characteristics, signal-to-noise ratio characteristics, harmonic characteristics, packet loss statics, and the like. If a communication link monitoring system is monitoring an electrical communication link, the monitoring system may collect information regarding voltage measurements, signal-to-noise ratio characteristics, packet loss statics, and the like. The information collected by the communication link monitoring systems may be communicated to the controller 212.

Based on the information collected about the physical communication links 208a-208h, the controller 212 may assess the health of logical communication links between devices in system 200. For example, a logical communication link between device 216a and 216c may be created using communication devices 206c and 206f and physical communication link 208d. The controller 212 may receive information about the health of the logical communication link created by communication devices 206c and 206f and physical communication link 208d from the communication link monitoring subsystems in communication devices 206c and 206f. In the event that a problem is detected in the physical communication link 208d, controller 212 may utilize a failover communication path. In various embodiments, the failover path may be specified in advance or may be dynamically created based on various criteria (e.g., available bandwidth, latency, shortest path, etc.). In the event that data traffic must be redirected because of a failure of physical communication link 208d, a new logical communication link may be created. The logical communication link may be embodied utilizing a variety of paths, with the shortest failover path utilizing communication device 206c, physical communication link 208h, communication device 206b, physical communication link 208c, communication device 206d, physical communication link 208f, and communication device 206f.

Figure 3A:
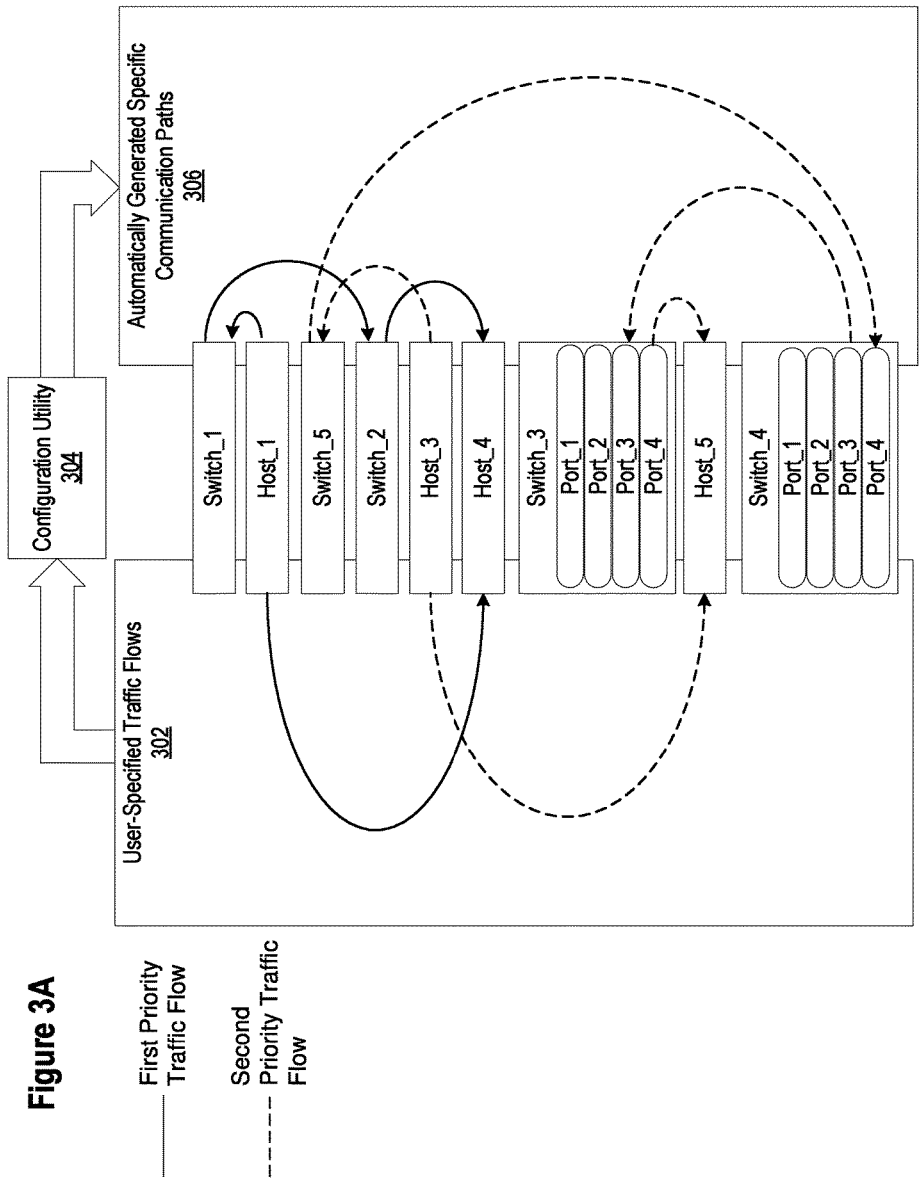
FIG. 3A illustrates a conceptual representation of a first priority traffic flow and a secondary priority traffic flow between distinct hosts, in which the first priority traffic flow and the second priority traffic flow are routed through physically distinct specific communication paths consistent with embodiments of the present disclosure.

FIG. 3A illustrates a conceptual representation of a first priority traffic flow and a secondary priority traffic flow between distinct hosts, and in which the first priority traffic flow and the second priority traffic flow are routed through physically distinct specific communication paths consistent with embodiments of the present disclosure. A user-specified configuration 302 may designate a first priority traffic flow between Host_1 and Host_4 and a second priority traffic flow between Host_3 and Host_5. Although the traffic flows are illustrated using unidirectional arrows, the traffic flows may be bi-directional. A configuration utility 304 may create automatically generated specific communication paths 306 based on the user-specified traffic flows 302. The automatically generated specific communication paths 306 may specify the details of the first priority traffic flow and the second priority traffic flow. Specifically, the first automatically generated specific communication path may comprise a connection between Host_1 and Switch_1, a connection between Switch_1 and Switch_2, and a connection between Switch_2_ and Host_4.

The first priority traffic flow and the second priority traffic flow generated by the configuration utility 304 may be generated such that they do not share any of the same physical communication links or switches. Specifically, the secondary priority traffic flow may include a connection from Host_3 to Switch_5, a connection between Switch_5 and Switch_4 (port 4), a connection between Switch_4 (port 3) and Switch_3 (Port 3), and a connection between Switch_3 (port 4) and Host_5.

Figure 3B:
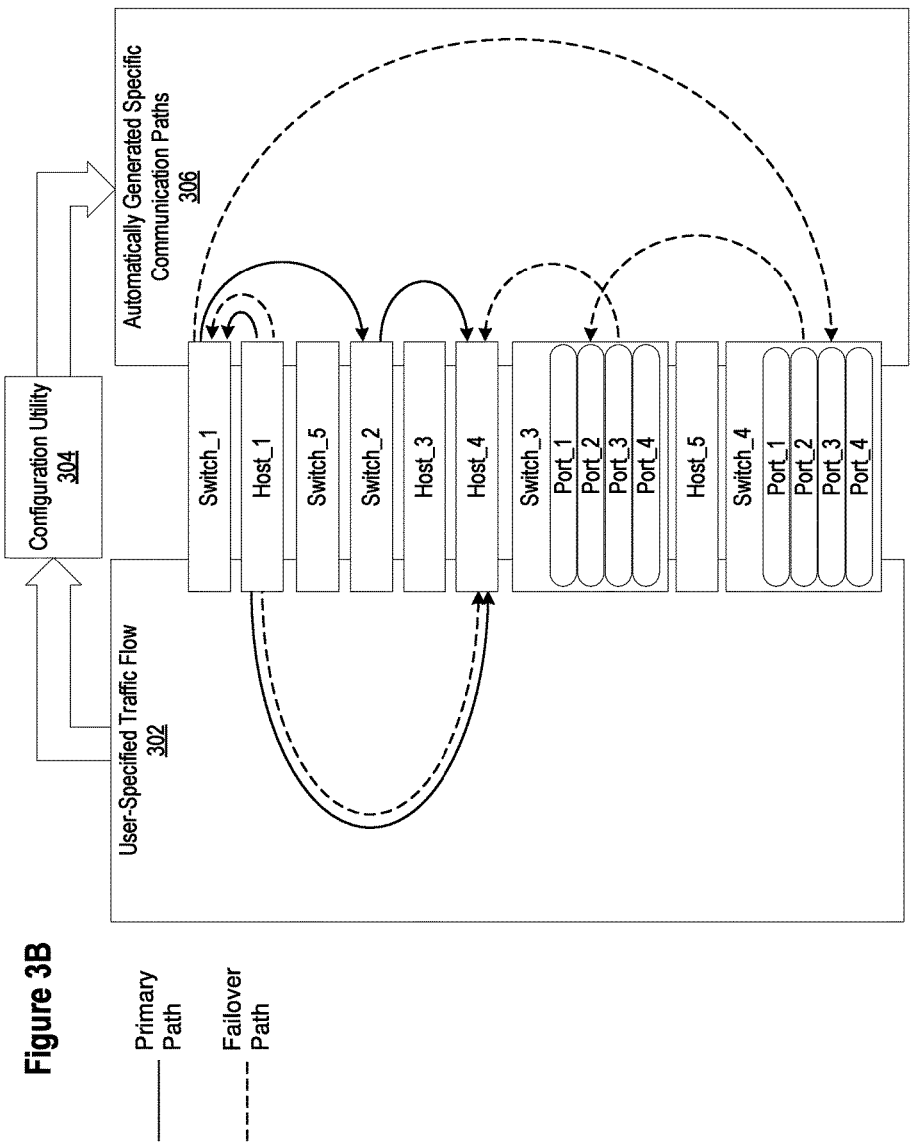
FIG. 3B illustrates a conceptual representation of a primary traffic flow and a failover traffic flow between two hosts in which the primary path and the failover path are routed through physically distinct paths consistent with embodiments of the present disclosure.

FIG. 3B illustrates a conceptual representation of a primary traffic flow and a failover traffic flow between two hosts in which the primary path and the failover path are routed through physically distinct paths consistent with embodiments of the present disclosure. A user-specified traffic flow 302 may designate a primary path between Host_1 and Host_4. A configuration utility 304 may create an automatically generated specific communication paths 306 based on the user-specified traffic flow 302. The automatically generated specific communication paths 306 may specify the details of the primary path and the failover path. Specifically, the primary path may comprise a connection between Host_1 and Switch_1, a connection between Switch_1 and Switch_2, and a connection between Switch_2_ and Host_4.

The secondary path generated by the configuration utility 304 does not share any of the same physical communication links or switches with the primary path, with the exception of the connection between the host and the proximate switch. Specifically, the secondary path may include a connection from Host_1 to Switch_1, a connection between Switch_1 and Switch_4 (port 3), a connection between Switch_4 (port 2) and Switch_3 (port 2), and a connection between Switch_3 (port 3) and Host_4.

The automatically generated specific communication paths 306 may satisfy the N−1 reliability standard since the failure of any single element, other than the connection between the host and the proximate switch, may be insufficient to disable both the primary path and secondary path. The N−1 reliability standard may be utilized in a variety of industries in which a high standard of reliability is maintained, such as electrical power systems, telecommunication systems, etc.

FIG. 4 illustrates a flow chart of a method 400 for receiving a first traffic flow and a second traffic flow and automatically generating corresponding communication routes through an SDN using a configuration utility consistent with embodiments of the present disclosure. A first traffic flow may be received from a user at 402, and a second traffic flow may be received from a user at 404. The user-specified traffic flows may be specified at a high level. For example, the user-specified traffic flows may designate specific hosts that may need to communicate. Referring to FIG. 3A, for example, the user-specified traffic flows 302 may simply specify that Host_1 should communicate with Host_4 and that Host_3 should communicate with Host_5.

Returning to a discussion of FIG. 4, a first priority designation associated with the first traffic flow may be received at 406, and a second priority designation associated with the second traffic flow may be received at 408. In some embodiments, the priority designations associated with the first traffic flow and the second traffic flow may be specified by a user, while in other embodiments, the priority designations may be automatically specified based on various criteria. In embodiments in which the priority designation is automatically specified, the criteria used to automatically determine the priority be based on the type of data associated with the traffic flow, an identifier of a source (e.g., an IP address, a MAC address, etc.), and other criteria.

A first specific communication path through the SDN corresponding to the first traffic flow may be generated at 410, and a second traffic flow may be generated at 412. In some embodiments, the first and second traffic flows may be generated using a traffic routing subsystem configured to generate the first specific communication path and the second specific communication path based on the first traffic flow and the second traffic flow, respectively. The traffic routing subsystem may identify a specific path including physical connections, routers, switches, etc. The traffic routing subsystem may specify the configuration of each intermediate device. In some embodiments, the traffic routing subsystem may be embodied as an SDN controller. In other embodiments, the traffic routing subsystem may be distinct from the SDN controller, but may operate in conjunction with the SDN controller. In the specific example illustrated in FIG. 2, the traffic routing subsystem may be embodied as one of the applications 210a-210c.

Figure 5:
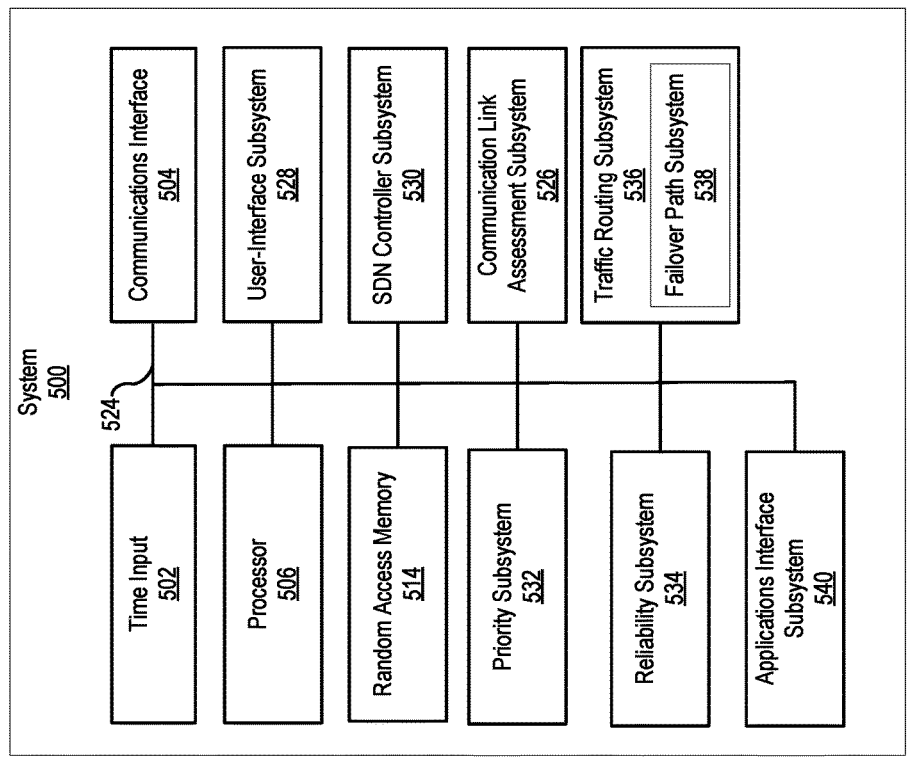
FIG. 5 illustrates a block diagram of a system configured to receive a plurality of traffic flows and to generate corresponding specific communication paths through an SDN consistent with embodiments of the present disclosure.

FIG. 5 illustrates a block diagram of a system 500 configured to receive a plurality of traffic flows and to generate a corresponding plurality of specific communication paths through an SDN consistent with embodiments of the present disclosure. In some embodiments, system 500 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

System 500 includes a communications interface 504 configured to communicate with other devices (not shown). Communications interface 504 may facilitate communications with multiple devices. System 500 may further include a time input 502, which may be used to receive a time signal (e.g., a common time reference) allowing system 500 to apply a time-stamp received data. In certain embodiments, a common time reference may be received via communications interface 504, and accordingly, a separate time input may not be required. One such embodiment may employ the IEEE 1588 protocol. A data bus 524 may facilitate communication among various components of system 500.

Processor 506 may be configured to process communications received via communications interface 504 and time input 502 and to coordinate the operation of the other components of system 500. Processor 506 may operate using any number of processing rates and architectures. Processor 506 may be configured to perform any of the various algorithms and calculations described herein. Processor 506 may be embodied as a general purpose integrated circuit, an application specific integrated circuit, a field-programmable gate array, and/or any other suitable programmable logic device.

Instructions to be executed by processor 506 may be stored in random access memory 514 (RAM). Such instructions may include information for processing routing and processing data packets received via communications interface 504 based on a plurality of traffic flows.

A user-interface subsystem 528 may be configured to receive from a user various types of information relating to configuring a software defined network. In some embodiments, the user-interface subsystem may be configured to receive traffic flows between various devices in a SDN. The user-interface system may also be configured to receive traffic flows specified at a high level. In some embodiments, the user-interface subsystem 528 may also be configured to receive priority designations associated with traffic flows. In such embodiments, the priority designations received from a user may be provided to a priority subsystem 528. While users may specify the priority associated with traffic flows in some embodiments, in other embodiments, the priority associated with traffic flows may be specified automatically in other embodiments.

An SDN controller subsystem 530 may be configured to perform a variety of functions associated with an SDN. The SDN controller subsystem 530 may implement various SDN controller functions directly, or the SDN controller subsystem 530 may be configured to coordinate operations of system 500 with an SDN controller (not shown). The SDN controller subsystem 530 may be configured to specify the configuration of various devices associated with a traffic flow.

A priority subsystem 532 may be configured to associate a priority designation with a traffic flow. The priority designation may be user-specified or generated based on various criteria. The criteria used to automatically determine the priority be based on the type of data associated with the traffic flow, an identifier of a source (e.g., an IP address, a MAC address, etc.), and the like. The priority subsystem may further be configured to restrict the types of data that may utilize certain communication links that carry high priority traffic. In one example, an SDN may include traffic designated as high-priority, medium-priority, and low-priority. The priority subsystem 532 may be configured to allow medium-priority data to utilize high priority communication links for fail over purposes; however, the priority subsystem 532 may prevent lower-priority data from being transmitted on high-priority communication links.

In some embodiments, certain types of data may be physically separated from other types of data. Separation of certain types of data may take several forms, including separating multicast communication flows from unicast flows, separating SCADA communication flows from engineering access communication flows, etc. Still further, prioritization may be based on host profiles in some embodiments. As such, a certain host profile may include a priority designation for an associated host that causes traffic to or from the prioritized host to be prioritized over other hosts.

Traffic routing subsystem 536 may be configured to generate a variety of specific communication paths through the software defined network. The traffic routing subsystem 536 may identify a specific path including physical connections, routers, switches, etc. The traffic routing subsystem 536 may specify the configuration of each intermediate device. The traffic routing subsystem 536 may be configured to generate physically distinct paths for certain traffic flows, such as high priority traffic flows.

The traffic routing subsystem 536, may further include a failover path subsystem 538 configured to generate a failover path. The failover traffic flow generated by the failover path subsystem 538 may be utilized in the event that a primary flow path is disrupted. The particular failover traffic flow may be physically distinct from the primary flow path, so that the primary flow path and the failover traffic flow are not both susceptible to a single point of failure. In some embodiments, failover path subsystem 538 may further be configured to obtain user confirmation of an automatically generated failover communication path. As such, a user may inspect the automatically generated failover traffic flow and make adjustments as necessary before the failover traffic flow is implemented.

A reliability subsystem 534 may be configured to determine enhancements to an SDN that may increase the network's reliability. For example, the reliability subsystem 534 may calculate enhancements to achieve N−1 reliability to N−3 reliability. An operator of the network may assess the requirement enhancements and determine if the additional costs are worth the reliability improvement.

A communication link assessment subsystem 526 may be configured to receive an indication of a status of various communication devices and communication links over time. A communication link assessment subsystem 526 may be configured to determine a deviation from normal parameters based on the status of the communication devices and the communication links. In other embodiments, the communication link assessment subsystem 526 may be configured to monitor packet loss, latency, and other metrics relating to data throughput. The communication link assessment subsystem 526 may be configured to determine whether traffic should be rerouted to a failover path.

An applications interface subsystem 540 may be configured to interact with a variety of applications operating in an applications plane of an SDN with which system 500 is in communication. In various embodiments, system 500 may expose an application programming interface (API) that an application may utilize to configure a data plane in an SDN or otherwise interact with the SDN. Applications may be tailored to meet a wide variety of specific needs, and such applications may interact with system 600 through application interface subsystem 540.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system to configure a plurality of traffic flows within a software defined network (SDN), the system comprising:
    an SDN controller that includes a processor and a computer-readable storage medium comprising instructions that when executed by the processor cause the SDN controller to:
        receive from a user a plurality of traffic flows using a user-interface subsystem, the plurality of traffic flows comprising at least:
            a first traffic flow between a first host and a second host, and
            a second traffic flow between a third host and a fourth host;
        receive a priority designation associated with at least a subset of the plurality of traffic flows using a priority subsystem, the subset comprising at least:
            a first high-priority traffic flow associated with the first traffic flow, and
            a second high-priority traffic flow associated with the second traffic flow;
        generate a first specific communication path through the software defined network using a plurality of communication devices corresponding to the first traffic flow;
        generate a second specific communication path through the software defined network using the plurality of communication devices corresponding to the second traffic flow;
        determine enhancements to the software defined network sufficient to cause at least one of the first specific communication path and the second specific communication path to increase reliability to remain operational after loss of a communication device of the plurality of communication devices using a reliability subsystem; and,
        configure the plurality of communication devices corresponding to the first and second traffic flows;
    wherein the first specific communication path is physically distinct from the second specific communication path.

2. The system of claim 1, wherein the instructions further cause the SDN controller to determine enhancements to the software defined network sufficient to cause the first specific communication path and the second specific communication path to transition from a first reliability standard to a second reliability standard, and wherein the second reliability standard comprises a more stringent reliability standard, using the reliability subsystem.

3. The system of claim 2, wherein the first reliability comprises an N−1 reliability standard and the second reliability standard comprises an N−2 reliability standard.

4. The system of claim 1, wherein the first specific communication path and the second specific communication path comprise distinct egress buffers associated with each of a plurality of intermediate devices.

5. The system of claim 1, wherein the SDN controller further comprises a failover path subsystem configured to generate a failover route through the software defined network corresponding to the first traffic flow, and the failover route is physically distinct from the first specific communication path.

6. The system of claim 5, further comprising a measurement subsystem configured to monitor a characteristic of the first traffic flow and to reroute the first traffic flow to the failover route based on a change in the characteristic.

7. The system of claim 5, wherein the failover path subsystem is further configured to obtain user confirmation of the failover route.

8. The system, of claim 5, wherein the failover path subsystem is configured to assess a plurality of criteria in connection with generation of the failover route, the plurality of comprising at least one of a shortest path between the first host and the second host, a shared bandwidth, a quality of service tag, a switch backplane load, and a physical topology.

9. The system of claim 1, wherein the user interface subsystem is further configured receive the priority designation from a user, and the priority subsystem is configured to receive the priority designation from the user-interface subsystem.

10. The system of claim 1, wherein the priority subsystem is configured to determine the priority designation without user action based on a plurality of criteria.

11. The system of claim 10, wherein the plurality of criteria comprises a first type of traffic flow to be physically separated from a second type of traffic flow.

12. A method of configuring a plurality of traffic flows within a software defined network (SDN), the method comprising:
    at an SDN controller, receiving from a user a plurality of traffic flows, the plurality of traffic flows comprising at least a first traffic flow between a first host and a second host, and a second traffic flow between a third host and a fourth host;
    receiving a priority designation associated with at least a subset of the plurality of traffic flows, the subset comprising at least: a first high-priority traffic flow associated with the first traffic flow, and a second high-priority traffic flow associated with the second traffic flow;
    generating a first specific communication path through the software defined network using a plurality of communication devices corresponding to the first traffic flow;
    generate a second specific communication path through the software defined network using the plurality of communication devices corresponding to the second traffic flow;
    determining enhancements to the software defined network sufficient to cause at least one of the first specific communication path and the second specific communication path to increase reliability to remain operational after loss of a communication device of the plurality of communication devices; and,
    the SDN controller configuring the plurality of communication devices corresponding to the first and second traffic flows;
    wherein the first specific communication path is physically distinct from the second specific communication path.

13. The method of claim 12, further comprising:
    determining enhancements to the software defined network sufficient to cause the first specific communication path and the second specific communication path to transition from a first reliability standard to a second reliability standard, and wherein the second reliability standard comprises a more stringent reliability standard.

14. The method of claim 13, wherein the first reliability comprises an N−1 reliability standard and the second reliability standard comprises an N−2 reliability standard.

15. The method of claim 12, wherein the method is performed by the SDN controller.

16. The method of claim 12, further comprising:
generating a failover route through the software defined network corresponding to the first traffic flow, and the failover route is physically distinct from the first specific communication path.

17. The method of claim 16, further comprising:
monitoring a characteristic of the first traffic flow; and
rerouting the first traffic flow to the failover route based on a change in the characteristic.

18. The method of claim 16, further comprising:
obtaining user confirmation of the failover route.

19. The method of claim 16, further comprising:
assessing a plurality of criteria in connection with generation of the failover route, the plurality of comprising at least one of a shortest path between the first host and the second host, a shared bandwidth, a quality of service tag, a switch backplane load, and a physical topology.

20. The method of claim 12, further comprising receiving the priority designation from a user.

* * * * *